June 12, 1962 J. DAIN ET AL 3,039,064

MICROWAVE CAVITY TUNERS UTILIZING REVERSE BIASED DIODES

Filed April 17, 1959 2 Sheets-Sheet 1

INVENTORS
John Dain
and
Eric Brian Butler Callick
BY Baldwin & Wright
ATTORNEYS

MICROWAVE CAVITY TUNERS UTILIZING REVERSE BIASED DIODES

Filed April 17, 1959 2 Sheets-Sheet 2

INVENTORS
John Dain
and
Eric Brian Butler Callick
BY Baldwin & Wight
ATTORNEYS

3,039,064
MICROWAVE CAVITY TUNERS UTILIZING REVERSE BIASED DIODES

John Dain and Eric Brian Butler Callick, Chelmsford, England, assignors to English Electric Valve Company Limited, London, England, a British company Filed Apr. 17, 1959, Ser. No. 807,223
Claims priority, application Great Britain June 30, 1958
2 Claims. (Cl. 331—83)

The invention relates to microwave tuners and is applicable to the tuning of microwave tubes of the kind in which an electron beam is coupled to a resonator. Though not limited to its application thereto, the invention is primarily designed for and advantageously applicable to the tuning of klystron tubes.

Figure 1:
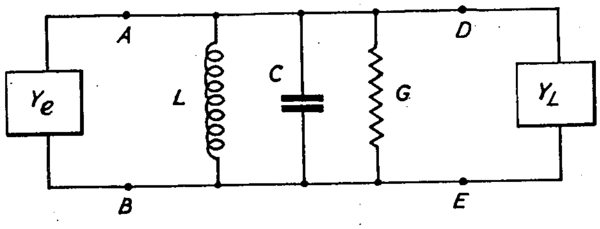
Figure 2:
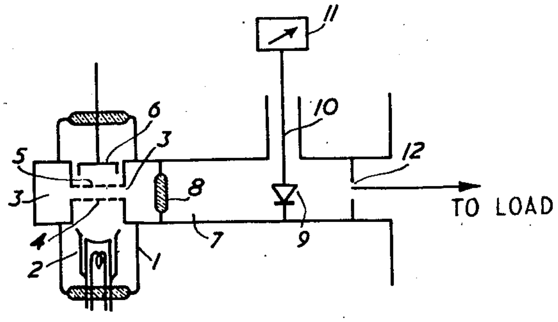
Figure 3:
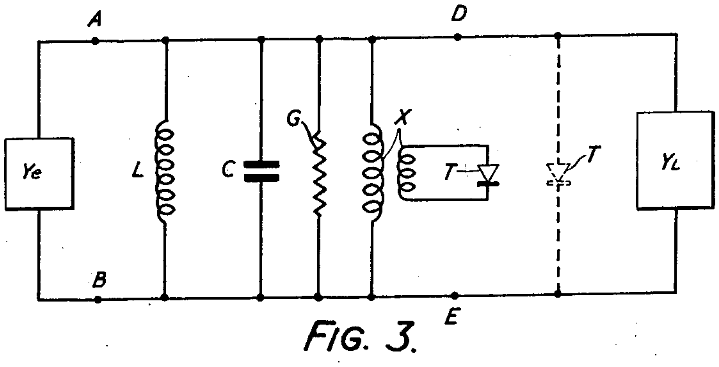
Figure 4:
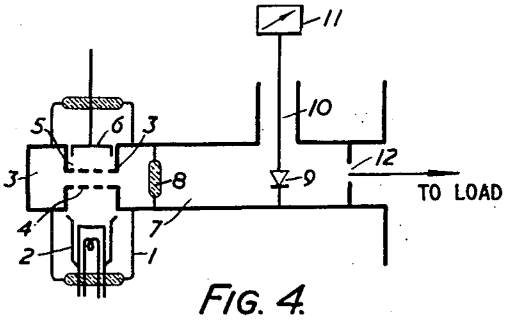
Figure 5:
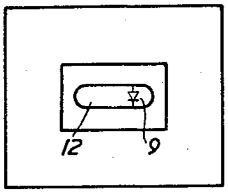
Figure 6:
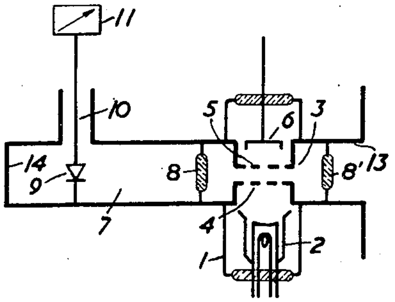

The invention is illustrated in and explained in connection with the accompanying drawings in which FIGURE 1 is a simplified equivalent circuit representing a klystron oscillator; FIGURE 2 is a simplified schematic diagram of one embodiment of the invention as applied to the tuning of a reflex klystron, FIGURE 3 is a simplified equivalent circuit diagram representing a klystron oscillator with a tuning arrangement; FIGURES 4 and 5 are mutually perpendicular views of another embodiment of this invention; and FIGURE 6 illustrates a further embodiment of this invention.

The tuning of a microwave oscillator tube such as a klystron may be explained with the assistance of the simplified equivalent circuit shown in FIGURE 1. In this figure the electron beam or space charge cloud of the tube is represented by a complex admittance $Y_e$ (shown in block form) connected between two terminals A and B. This admittance $Y_e$ is equal of the sum $G_e+B_e$ where $G_e$ is the electronic conductance and $B_e$ is the electronic susceptance. Both the electronic conductance and the electron susceptance are dependent on frequency and the electronic configuration of the tube, and, as well known, the conductance can assume negative values over certain bands of frequencies. The resonant circuit of the tube is represented in FIGURE 1 by an inductance L, a capacitance C and a conductance G, all in parallel. The load fed by the tube, suitably transformed to the load terminals D and E, is represented by an admittance $Y_L$ represented in block form. The resonant circuit and the load can be regarded as combined into a single admittance $Y_e$ (not shown in FIGURE 1) connected between the terminals A, B.

The steady state of the system when oscillating is that in which:

$$Y_e+Y_c=0$$

Also:

$$B_e+B_c=0$$

$$G_e+G_c=0$$

where $B_c$ and $G_c$ are respectively the susceptance and conductance of the resonant circuit. The frequency at which the system oscillates is determined by the equation:

$$B_e+B_c=0$$

and the amplitude of oscillation is determined by the equation:

$$G_e+G_c=0$$

It follows from the foregoing that there are two fundamentally different ways in which the frequency can be varied and tuning can be effected—namely electronically and by acting on the resonant circuit. Since the electronic susceptance $B_e$ and the resonant circuit susceptance $B_c$ are both functions of frequency, alteration of the magnitude of either will change the oscillation frequency. (Under normal conditions of operation the electronic conductance $G_e$ and the circuit conductance $G_c$ are not so sensitive to frequency.) Tuning may therefore be effected electronically by varying electronic susceptance, e.g. by changing the collector voltage applied to the tube. However, the electronic conductances change at the same time and therefore the frequency change is accompanied by an amplitude change. This effect limits the frequency range over which electronic tuning may usefully be applied. To quote a practical figure, a present-day reflex klystron can be tuned electronically by varying the reflector voltage over a range of only about 0.5% of the centre frequency.

In the second method of tuning, namely by changing the resonant circuit susceptance independently of frequency, the changing of the resonant circuit susceptance is in general effected mechanically. This method of tuning has the advantage that it will give a much wider tuning range, in part because the conductances do not vary very rapidly with frequency, and in part because it is possible to vary the electronic conductances independently of the mechanical tuning control so that considerably enhanced frequency changes can be achieved without serious loss of output power. Tuning ranges of the order of 20% and more of the centre frequency are possible by this method of tuning. However, such mechanical tuning systems are difficult and expensive to manufacture and, due to considerations of mechanical inertia, are limited to use in cases in which only relatively low rates of change of frequency are required. Moreover, they are liable to be affected by vibration so that the oscillator frequency is likely to deviate under the influence of externally applied vibrations and accelerations. These are serious defects.

The invention seeks to provide improved microwave tuners which will have neither the disadvantages of the known electronic tuners (notably limitation of range of tuning) nor the aforesaid disadvantages of known mechanical tuners and which shall be simple, easy to construct and involve no mechanically moving parts.

According to this invention a tuning arrangement for a microwave oscillator having a resonator coupled to the electron beam thereof comprises a semi-conductor diode which is connected with said resonator so as to include, in the circuit of said resonator, a capacitance which can be varied by varying a bias applied to said diode in the so-called reverse direction. Variation of tuning can then be accomplished by varying the reverse bias on the diode. According to a feature of this invention a tuning arrangement for a klystron tube comprises a semi-conductor diode coupled to the cavity resonator thereof so as to include, in the resonant circuit constituted in the main by said resonator, a capacitance which can be varied by varying the reverse bias on said diode.

In one embodiment of the invention the normally provided, internal, cavity resonator of a klystron tube is tightly coupled through a vacuum tight window to an external resonator in which is mounted a semi-conductor diode having one terminal connected to said external resonator and the other connected to a lead over which a variable reverse bias, for varying the tuning, can be applied. The bias lead should be a choke connection designed to prevent the loss of high frequency power down the lead. Preferably output power to a load is taken off through an iris or aperture in the external resonator.

The semi-conductor diode may be a germanium diode.

Where arrangements in accordance with the invention as so far described are sought to be used at very high frequencies e.g. microwave frequencies above about 1000 mc./s. certain practical difficulties arise. At such frequencies the total capacitance required to be presented by the semi-conductor diode is very low with the result that, if the diode is made of normal known materials—e.g. if it is a germanium diode—its junction area must be so small as to render the diode inconvenient and difficult and expensive to manufacture. Again, diodes of normally available known materials exhibit considerable voltage sensitivity with the result that, if the oscillator to be tuned delivers appreciable power, tuning becomes difficult and indeed, tuning control may be lost altogether. In one case it was found experimentally with a 9000 mc./s. oscillator that control was lost when the power generated exceeded a few milliwatts.

In order to reduce these practical difficulties arising at very high frequencies the tuning semi-conductor diode is, in accordance with a further feature of the invention so connected and arranged in relation to the resonator circuit in which its capacitance is included that there is a step-down transformation ratio between the voltage across said resonator and the voltage across said diode.

In one embodiment of this further feature of the invention the normally provided internal, cavity resonator of a klystron tube is tightly coupled through a vacuum-tight window to an external resonator constituted by a length of waveguide and a semi-conductor diode having one terminal connected to said external resonator and the other connected to a variable bias supply lead is mounted in said length of wave guide in an off-set position with respect to the centre line of said waveguide resonator and connected thereto at a point where the radio frequency electric field is lower than it is on the centre line. In this way, the radio frequency across the diode can be stepped down by a desired ratio which depends on the extent of off-set and the diode used can be of higher capacitance and lower voltage than would be the case if it were arranged on the centre line.

In another embodiment of the aforesaid further feature of this invention the normally provided internal, cavity resonator of a klystron tube is tightly coupled through vacuum-tight windows to two radio frequency outlets one of which supplies output energy to a load and the other of which is a closed external cavity used for tuning and the diode is positioned in the cavity and connected between a variable bias supply lead and a point in the cavity so chosen that the radio frequency voltage across the diode is reduced to a desired extent. The cavity may conveniently be a length of waveguide short circuited at the far end. In this case the nearer the diode is to the short-circuited end, the lower will be the radio frequency voltage across it, the effective step-down voltage ratio tending to infinity at the short-circuited end.

Referring now to FIGURE 2 which shows one embodiment of the invention as applied to a reflex klystron, the klystron tube has within an evacuated envelope 1, the usual electron beam-forming electron gun structure 2, internal resonator 3 and reflector electrode 6. The structure of the resonator 3 has grids 4 and 5 which extend across the electron beam in the usual way. Closely coupled to the internal resonator 3 is an external resonator 7, the coupling being effected through a vacuum tight window 8. Within the external resonator is a germanium or other suitable semi-conductor 9 which is connected on one side to the external resonator 7 and has a lead 10 which is brought out from the other side to a variable source of reverse bias voltage represented by the arrowed block 11. The bias lead is arranged as conventionally indicated to constitute a choke connector designed to prevent leakage of radio frequency power down the lead. Output to a load (not shown) is taken off through an aris or aperture 12 from the external resonator.

Referring to FIGURE 3, which is a diagram of the same nature as FIGURE 1 the electron beam space charge cloud of a klystron tube is represented by a complex admittance $Y_e$ (shown in block form) connected between two terminals A and B. The resonant circuit of the tube is represented by an inductance L, a capacitance C and a conductance G all in parallel. The load, suitably transformed to the load terminals D and E, is represented, also in block form, by an admittance $Y_L$. In a tuning arrangement as illustrated by FIGURE 2 the tuning diode T is, in effect, directly connected between terminals D and E as shown in broken lines in FIGURE 3. With this arrangement, if the diode capacitance is varied from a value $C_1$ to a value $C_2$ the oscillator tuning will be varied from a frequency $f_1$ to $f_2$ as given by the expressions:

$$(2\pi f_1)^2L(C+C_1)=1$$

$$(2\pi f_2)^2L(C+C_2)=1$$

Where L and C are respectively the values of the elements referenced L and C.

The radio frequency voltage V across the diode is given by:

$$V=\sqrt{2W/G_L}$$

Where W is the output powers and $G_L$ is the conductance of the load.

Where operation at very high frequencies is required, therefore, the diode is not connected as shown in broken lines in FIGURE 3 but is so connected and arranged as to be, in effect, coupled through a step-down voltage transformer. This is represented in full lines in FIGURE 3, the diode, still referenced T, being coupled through a supposedly "ideal" transformer X of step-down ratio $n$. With this arrangement the same tuning range from $f_1$ to $f_2$ can be obtained by varying the diode capacitance between values $C_1'$ and $C_2'$ such that $$C_1'=n^2C_1$$

and $$C_2'=n^2C_2$$

while the voltage V' across the diode is now given by $$V'=(\sqrt{2W/G_L})/n$$

Thus the larger the value of $n$ the larger the diode capacitance which is required for a given frequency and the smaller the radio frequency voltage across the diode for a given power and load conductance.

FIGURES 4 and 5 are mutually perpendicular views of a preferred embodiment of the invention which is preferred for use when very high frequency operation is required. Referring to these figures a reflex klystron tube has within an evacuated envelope 1, the usual electron beam forming electron gun structure 2, internal resonator 3 and reflector electrode 6. The structure of the resonator 3 has grids 4 and 5 which extend across the electron beam in the usual way. Closely coupled to the internal resonator 3 is an external resonator 7, the coupling being effected through a vacuum-tight window 8. Within the external resonator is a germanium or other suitable semi-conductor 9 which is connected on one side to the external resonator 7 and has a lead 10 which is brought out from the other side to a variable source of reverse bias voltage represented by the arrowed block 11. As shown in FIGURE 5, however, the diode 9 is not on the centre line of the resonator 7 but is off-set well to one side, i.e. to the right (in FIGURE 5) of the centre line. Here the radio frequency field is lower than at the centre line and in consequence the voltage across it is reduced just as though it were connected through a step-down transformer, the reduction ratio depending on the amount of off-set. The bias lead to the diode is arranged as conventionally indicated to constitute a choke connector designed to prevent leakage of radio frequency power down the lead. Output to a load (not shown) is taken off through an iris or aperture 12 from the external resonator.

In the modification shown in FIGURE 6 the klystron has two output paths, one through the window 8' and output guide 13 to a load (not shown) and the other through window 8 to an external resonator 7 constituted by a length of waveguide with a short-circuiting plate 14 at the far end. The diode 9, fed with variable bias from a source 11 through a choke lead 10, is in the resonator 7. The nearer the diode 9 is to the short-circuiting wall 14, the less will be the voltage across it. If, as is indeed the case, the arrangement is equivalent to one in which the diode is fed through a transformer, the nearer the diode (and its point of connection to the resonator) is to the short-circuited end of the resonator, the larger is the step-down ratio of the equivalent transformer: the nearer the diode is to the position of maximum radio frequency electric field, the nearer the ratio of the equivalent transformer is to unity.

We claim:

1. A tuning arrangement for a klystron microwave oscillator comprising in combination an internal cavity resonator coupled to the electron beam of said oscillator, an external resonator, a vacuum tight window located between said internal cavity resonator and said external resonator whereby said resonators are tightly coupled, a semi-conductor diode within said external resonator, means connecting one end of said diode to the external resonator and means connected to the other end of said diode for applying variable reverse bias thereto, said external resonators including a short circuit and wherein said semi-conductor diode is connected to said resonator adjacent said short circuit, whereby there is a step-down transformation between the voltage across said resonator and the voltage across said diode.

2. A tuning arrangement for a klystron microwave oscillator comprising in combination an internal cavity resonator coupled to the electron beam of said oscillator, an external resonator, a vacuum tight window located between said internal cavity resonator and said external resonator whereby said resonators are tightly coupled, a semi-conductor diode within said external resonator, means connecting one end of said diode to the external resonator and means connected to the other end of said diode for applying variable reverse bias thereto, said external resonator being constituted by a length of waveguide, said semi-conductor diode being mounted therein in an off-set position with respect to the center line of said waveguide resonator and connected thereto at a point where the radio frequency electric field is lower than on the center line of said waveguide, whereby the voltage developed across said diode is lower than it would be if said diode were connected at the center line of said waveguide.

References Cited in the file of this patent

UNITED STATES PATENTS

| | | |
|---|---|---|
| 2,517,731 | Sproull | Aug. 8, 1950 |
| 2,752,495 | Kroger | June 26, 1956 |

FOREIGN PATENTS

| | | |
|---|---|---|
| 705,423 | Great Britain | Mar. 10, 1954 |

OTHER REFERENCES

"Junction Diode A. F. C. Circuits," by Johnstone in Wireless World, pages 354, 355, August 1956.